United States Patent [19]
Raab et al.

[11] Patent Number: 5,234,134
[45] Date of Patent: Aug. 10, 1993

[54] DEVICE FOR THE MEASURED DISPENSING OF LIQUIDS OUT OF A STORAGE CONTAINER

[75] Inventors: Alfred Raab, Attenhofen; Alfredo D. Ciavarella, Oberkochen; George Plester, Essen, all of Fed. Rep. of Germany; Frederick D. Schorr, Decatur, Ga.; Georg Troska, Herten, Fed. Rep. of Germany

[73] Assignees: The Coca-Cola Company, Atlanta, Ga.; Bosch-Siemens Hausgerate GmbH, Munich, Fed. Rep. of Germany

[21] Appl. No.: 616,919

[22] Filed: Nov. 21, 1990

Related U.S. Application Data

[63] Continuation-in-part of Ser. No. 410,882, Sep. 22, 1989, Pat. No. 5,058,780.

[30] Foreign Application Priority Data

Dec. 11, 1989 [DE] Fed. Rep. of Germany ....... 3940875

[51] Int. Cl.$^5$ .............................................. G01F 11/00
[52] U.S. Cl. ..................................... 222/321; 222/333
[58] Field of Search ............... 417/469, 486, 487, 497; 222/321, 333, 379, 383, 129.7, 129.4, 504, 509, 538, 530

[56] References Cited

U.S. PATENT DOCUMENTS

| | | | |
|---|---|---|---|
| 4,079,861 | 3/1978 | Brown | 222/333 X |
| 4,693,400 | 9/1987 | Frahm et al. | 222/538 X |

FOREIGN PATENT DOCUMENTS

| | | | |
|---|---|---|---|
| 0010963 | 5/1980 | European Pat. Off. | 222/321 |
| 0011487 | 5/1980 | European Pat. Off. | 222/383 |

*Primary Examiner*—Andres Kashnikow
*Assistant Examiner*—A. Pomrening
*Attorney, Agent, or Firm*—Birch, Stewart, Kolasch & Birch

[57] ABSTRACT

A dosing unit for concentrate in a post-mix beverage dispenser is described which includes an enclosed cylinder space, and a pump piston with a bore running parallel with the axis. A control piston which is in contact with the input side shutoff of the cylinder space is disposed within and movable longitudinally of the bore in the pump piston. The control piston includes an intake opening, and in contact with the pump piston, forms an outlet opening, where the intake and the outlet openings are alternately opened or closed through axial movement of the control piston with respect to the cylinder space and the pump piston. The control piston movement is restricted with respect to the accelerator piston and constrained by axial impact points, so that an axial movement forced upon the control piston causes an impulse in both directions to open or close the intake or the outlet openings, after which by carry-over of the particular impact, the pump piston is moved axially the same distance. The dosing unit is mounted on a concentrate storage container with the intake opening thereof in liquid communication with a discharge opening in the storage container.

1 Claim, 2 Drawing Sheets

DEVICE FOR THE MEASURED DISPENSING OF LIQUIDS OUT OF A STORAGE CONTAINER

BACKGROUND OF THE INVENTION

This application is a continuation-in-part of prior U.S. application Ser. No. 07/410,882 filed Sept. 22, 1989, which is now U.S. Pat. No. 5,058,780.

The present invention refers to a device for the measured dispensing of liquids from a storage container, particularly for the measured dispensing of beverage concentrates in an automatic beverage dispenser, where drinks can be prepared by mixing a base liquid, e.g. carbonated water, and at least one beverage concentrate stored in a storage tank.

Such a device will preferably be able to provide, in automatic beverage dispensers where carbonated water is mixed with beverage concentrates to make a soft drink, the beverage concentrates in controlled amounts from a storage tank for the mixing process involved in the making of a post-mix beverage. In this connection it is particularly important, while utilizing the simplest possible means when measuring out the carbonated water, to also precisely measure out the dispensed beverage concentrates in order to achieve with necessary precision the desired mix proportions for the post-mix drink being prepared. These mix proportions shall achieve the same standard as the comparable ready-made (pre-mix) drinks on the market in bottles or cans.

For placement into automatic beverage dispensers to dispense beverage concentrates, dosage chamber devices have been developed. These dosage chamber devices are attached to a storage tank with the dispensing mouth at the bottom. By means of a magnet system a control valve inside this dosage chamber device is raised from a lower position, where the outlet port of the chamber is closed, to a higher position, where the inlet port of the chamber is closed, so that the contents of the dosage chamber can flow out by force of gravity. However, the dosage chamber space can become filled with air. When the control valve resumes its lower position, the beverage concentrate stored in the storage tank ends up in the dosage chamber by force of gravity, and any air in the dosage chamber will flow into the storage tank. The control force needed to activate the control valve is correspondingly slight, since no actual propulsion force need be produced. There are storage tanks with either rigid or flexible walls. In both cases there is an exchange of volume through extracting beverage concentrates by the use of air.

The above-described dosage chamber devices are very difficult to reduce in size due to technical realities relating to size and the volume they dispense. They are above all suited for dispensing concentrates for 1/10 drink portion units. For smaller amounts greater problems with functioning and dosage precision are presented. So these known dosage chamber dispensers make it difficult to dispense individual drinks on demand.

It is also generally known how to extract and dispense liquid out of a flexible storage tank with the aid of a pump system. In such a system, a storage tank with flexible walls (bag-in-box containers) can be emptied without air having to flow into the storage tank for volume exchange. However, for beverage concentrates to achieve very precise dispensed amounts, these bag-in-box/pump systems have functional limitations.

SUMMARY OF THE INVENTION

The object of this invention is to prepare a dosage unit which makes it possible to do precise dispensing almost continually, independent of external influences. For example, for automatic beverage dispensers, to mix the drink components into a single drink, these types of devices are very important.

The objects of the present invention are fulfilled by providing an apparatus for dispensing metered quantities of liquid from a container through a discharge opening thereof comprising:

a pump housing having an inlet port in liquid communication with said discharge opening, said inlet port being formed in a housing wall disposed across the discharge opening of the container;

a pump piston disposed for reciprocating movement within said housing through displacement strokes of predetermined lengths, said pump piston having a drive face opposite to said inlet port and housing wall, said drive face and wall defining a pump chamber therebetween for receiving the metered quantity of liquid to be pumped from said container, said pump piston also having a bore extending through said drive face in alignment with said inlet port;

control piston means mounted for reciprocating movement in said bore of the pump piston, said control piston means having an inlet end and an outlet end spaced along a longitudinal axis thereof extending through said bore, said inlet and outlet ends each having at least one opening connected by a longitudinal passage for accommodating the flow of liquid through the control piston means, said control piston means being capable of reciprocating through a control stroke between a first distal position in which the inlet end of the control piston means is in sealing engagement with the inlet port of said pump housing to thereby close said inlet port and the at least one opening in the inlet end of the control piston means, and a second distal position in which said inlet end is in sealing engagement within the bore of said pump piston, said inlet end of the control piston means being movable to the dispensing position within said pump chamber intermediate said first and second distal positions; and stop means disposed between said control and pump pistons for picking up said pump piston and causing it to follow the movement of said control piston for a displacement stroke through a range of movement between the respective first and second distal positions of the inlet end of the control piston means, said displacement stroke being shorter than the control stroke of the control piston whereby said control piston is movable independently of the pump piston for portions of the control stroke thereof between said first and second distal positions;

said pump piston being movable through said displacement strokes of predetermined lengths by said control piston means including a suction stroke as the control piston means moves from said first distal position toward said second distal position and through a compression stroke as the control piston means moves from said second distal position toward said first distal position, the inlet end of the control piston being sealingly engaged within the pump piston bore during said suction stroke, thereby closing the inlet openings therein, and the inlet end of the control piston being disposed in the dispensing position during the compression stroke of the pump piston;

whereby fluid is dispensed via said passage from the outlet end of said control piston during the compression stroke of the pump piston and is drawn into said pump chamber from the container by suction during said suction stroke.

An apparatus with these features is characterized by the fact that precise dosing of the desired liquid can be achieved in a practically continuous reciprocal series of relatively very small individual dose amounts. By being propelled by e.g. an eccentric device, on one hand the dosage cycles can be in rapid succession, and accurately quantifiable. The end effect is that the easily attainable number of dispensing cycles of the pump collectively provides the desired volume of beverage concentrate for a given drink.

It would be possible to manufacture the parts of the device for the measured dosaging of liquids out of synthetic materials, such as plastic. This is very advantageous from a production-technical point of view. By selecting appropriate materials, the desired glide properties between the relatively closely moving functioning parts can be achieved.

Also this device can be immediately and firmly attached to a disposable storage tank. This makes it possible to install the dosage device unerringly especially with regard to the individual dosage amount to suit the kind of liquid it is to dispense. This dosage amount is therefore, in automatic beverage dispensers, accurate for the desired mix proportions of the finished drink made with the particular beverage concentrate. The diluent, i.e. the carbonated water, can therefore be added at some later time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
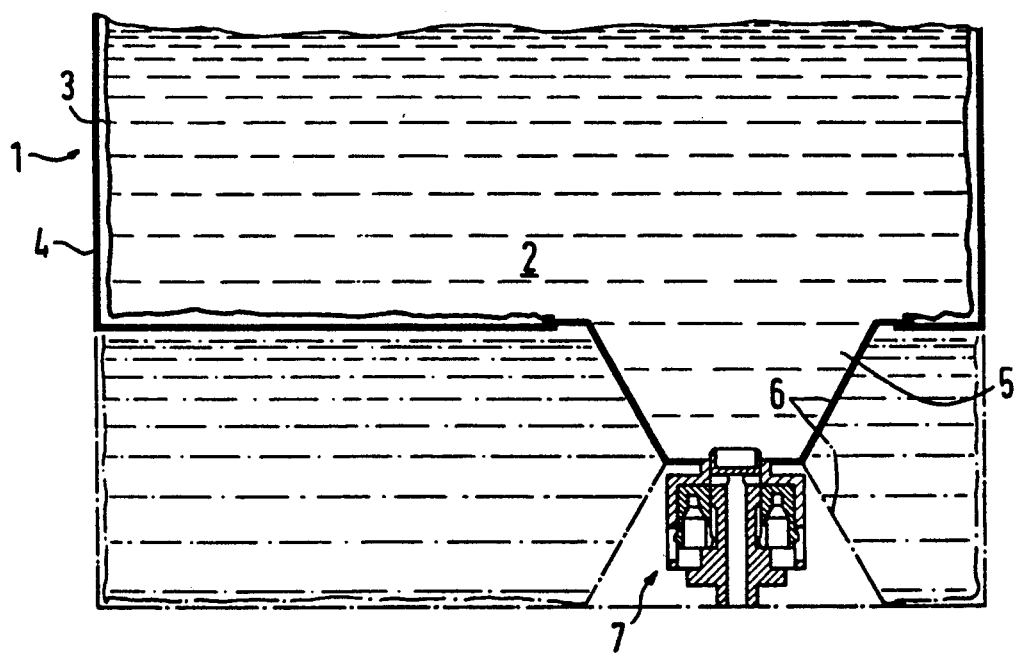
FIG. 1 is the dosing device of the present invention connected to a storage tank shown schematically.

A dosing device according to FIG. 1 has a storage tank 1 for holding a beverage concentrate 2, consisting of an internal container with flexible walls, such as a plastic bag 3, and a box-shaped container with essentially rigid container walls 4 enclosing this inner container 3. The flexible walls 3 of the inner container adjust to the existing volume of the beverage concentrate 2. Here it is important that through slits or openings in the area 5 of the walls 4, air can get in between the walls 4 and the walls 3. In the area of the outlet location 5, over a cone 6, made of elastic material, the dispensing device 7 is in close contact with the walls 3 and walls 4. During transport and storage the cone 6 with the dispensing device 7 is turned upside down in the interior of the storage tank 1, as shown by the broken line in the sketch.

Figure 2:
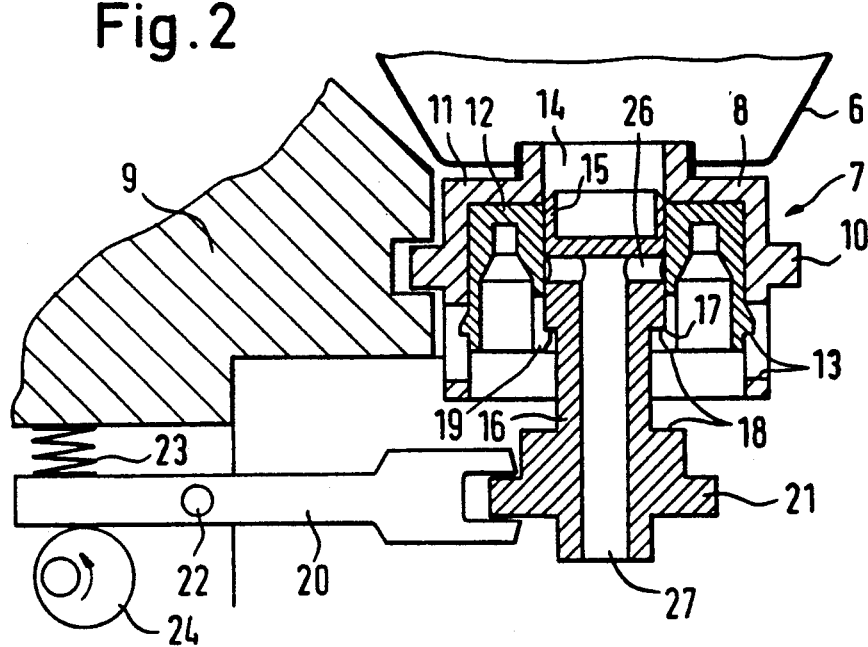
FIG. 2 is the dosing device of the present invention connected to an actuator system shown schematically.
Figure 3A:
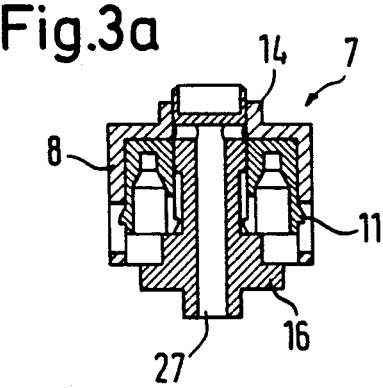
FIGS. 3a to 3d illustrate various operating positions of the dosing device of FIGS. 1 and 2.
Figure 3B:
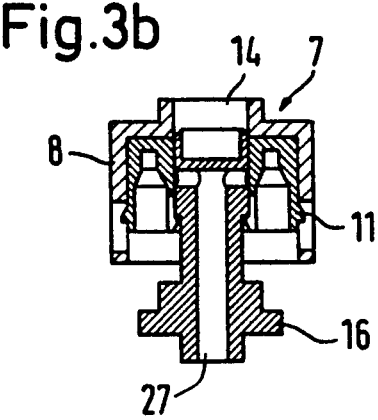
Figure 3C:
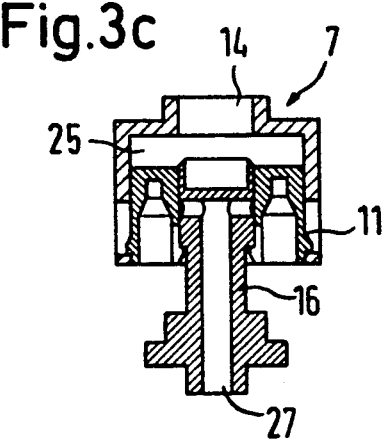
Figure 3D:
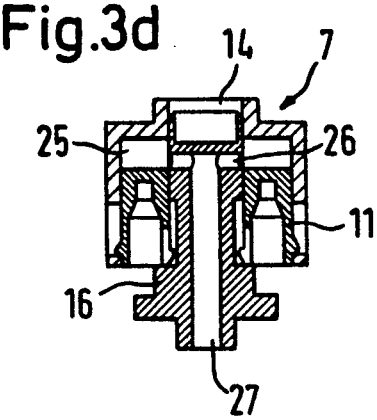

FIG. 2 shows the construction of the dosing device of FIG. 1. This dosing device 7 is composed of a casing 8, which is stored in the dispenser area of a drink dispenser in its device casing upon protrusions 10. Inside this casing 8, there is an accelerator (pump) piston 11 axially disposed between impact points 12 and 13 so it can move. These impact points fix the accelerator piston stroke which determines the volume for the beverage concentrate to be dispensed in a particular work cycle. An influx opening 14 in the casing 8 and a central passage 15 in the accelerator piston 11 are concentrically aligned, so that inside, a shaft of a control piston 16 can move axially. The axial movement between control piston 16 and accelerator piston 11 is limited by impact points 17 and 18. The impact areas 17 and 18 of the accelerator piston 11 have conical areas 19 and can move radially aside, so that control piston 16 in the passage 15 of the accelerator piston 11 can be easily installed from a manufacturing standpoint. The control piston 16 will be activated by an intermediate lever 20 that fits over a protrusion 21 of the control piston 16. The intermediate lever 20 is fixed around an axle 22 and will be driven by a spring 23 cooperating with an eccentric drive 24 of a motor not shown. The motor drive is purposely fashioned so that the eccentric will always be returned to same rest/angle position.

FIGS. 3a to 3d illustrate the functioning of the doser 7 through one work cycle. It is assumed that the start position of the operating parts are in the position shown in FIG. 3a. Here the accelerator piston 11 and the control piston 16 are entirely inside the casing 8, so that the casing intake 14 is closed and no pump volume area is left between casing 8 and accelerator piston 11. When later the control piston 16 is run via the eccentric 24, the control piston 16 is moved down to the position shown in FIG. 3b where the areas 17 engage conical areas 19 so that surfaces between control piston 16 and accelerator piston 11 engage. As the control piston 16 moves further down, the accelerator piston 11 is also moved down over these impact points 17, and indeed into the position shown in FIG. 3c, where between the accelerator piston 11 and the casing 8 a pump-volume area 25 is created. Now beverage concentrate will be sucked into this pump-volume area 25 from the storage tank. To continue, the control piston 16 is again raised by the intermediate lever 20 by eccentric 24, and into the position shown in FIG. 3d. This causes the casing intake 14 to be closed by the upper part of the control piston 16, so that now no beverage concentrate can flow back from the pump volume area 25 to the storage tank 1. At the same time side channels 26 in liquid communication with an axial dispensing bore 27 end up in liquid communication with the pump volume area 25. As the control piston 16 continues to move up to the position in FIG. 3a, impact points 18 between the control piston 16 and the accelerator piston 11 come together, so that the accelerator piston is pushed up and thereby totally eliminates the pump volume area 25. The beverage concentrate located in the pump volume area 25 is then pressed down and out through the side channels 26 and the dispensing bore 27.

Since the pump volume can be measured very precisely, this dispenser 1 can achieve very close volume measurement and, to be sure, due to the fact that the pump volume can also be made quite small, through cyclical repetitions of the described dispensing procedure over eccentric 26, almost any desired amounts can be prepared with high dispensing precision.

For the dispenser of the invention it is important that the particular movement of the control piston is sure to precede the action of the accelerator piston in the area of the free space between the impact points. This can be supported by corresponding friction between control piston and accelerator piston on one hand, and accelerator piston and casing on the other. Still, since the accelerator piston picks up the acceleration force and carries it on, the desired motion sequence is essentially assured by this fact alone.

One must watch out that the lift which is transmitted over intermediate lever 20 from eccentric 24 to control piston 16 is fixed so that it agrees with the lift possibility limited by the impact points between the control piston and accelerator piston on one hand, and between the accelerator piston and casing on the other. Through elasticity in the area of the device casing fittings of the dispenser and/or in the area of the drive transfer to the control piston, a slight overlift can be added, so that the actual lift movement is determined by the impact points provided.

In practice the mounting of the dispenser device casing 9 and the gear engagement between the cam-driven intermediate lever 20 and the control piston will be professionally fashioned so that function-impairing tipovers are avoided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for dispensing metered quantities of liquid from a container through a discharge opening thereof comprising:

a pump housing having an inlet port in liquid communication with said discharge opening, said inlet port being formed in a housing wall disposed across the discharge opening of the container;

a pump piston disposed for reciprocating movement within said housing through displacement strokes of predetermined lengths, said pump piston having a drive face opposite to said inlet port and housing wall, said drive face and wall defining a pump chamber therebetween for receiving the metered quantity of liquid to be pumped from said container, said pump piston also having a bore extending through said drive face in alignment with said inlet port;

control piston means mounted for reciprocating movement in said bore of the pump piston, said control piston means having an inlet end and an outlet end spaced along a longitudinal axis thereof extending through said bore, said inlet and outlet ends each having at least one opening connected by a longitudinal passage for accommodating the flow of liquid through the control piston means, said control piston means being capable of reciprocating through a control stroke between a first distal position in which the inlet end of the control piston means is in sealing engagement with the inlet port of said pump housing to thereby close said inlet port and the at least one opening in the inlet end of the control position means, and a second distal position in which said inlet end is in sealing engagement within the bore of said pump piston, said inlet end of the control piston means being movable to a dispensing position within said pump chamber intermediate said first and second distal positions; and stop means disposed between said control piston means and said pump piston for picking up said pump piston and causing it to follow the movement of said control piston means for a displacement stroke through a range of movement between the respective first and second distal positions of the inlet end of the control piston means, said displacement stroke being shorter than the control stroke of the control piston means whereby said control piston means is movable independently of the pump piston for portions of the control stroke thereof between said first and second distal positions;

said pump piston being movable through said displacement strokes of predetermined lengths by said control piston means including a suction stroke as the control piston means moves form said first distal position toward said second distal position and through a compression stroke as the control piston means moves from said second distal position toward said first distal position, the inlet end of the control piston means being sealingly engaged within the pump piston bore during said suction stroke, thereby closing the therein, and the inlet end of the control piston means being disposed in the dispensing position during the compression stroke of the pump piston;

whereby fluid is dispensed via said passage from the outlet end of said control piston means during the compression stroke of the pump piston and is drawn into said pump chamber from the container by suction during said suction stroke.

* * * * *